(12) United States Patent
Okamura

(10) Patent No.: US 6,927,881 B2
(45) Date of Patent: Aug. 9, 2005

(54) IMAGE READER

(75) Inventor: Keiichi Okamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 525 days.

(21) Appl. No.: 10/131,263

(22) Filed: Apr. 25, 2002

(65) Prior Publication Data
US 2002/0135823 A1 Sep. 26, 2002

Related U.S. Application Data

(63) Continuation of application No. PCT/JP01/07439, filed on Aug. 29, 2001.

(30) Foreign Application Priority Data

Aug. 29, 2000 (JP) ........................................ 2000-259219

(51) Int. Cl.$^7$ ................................................. H04N 1/04
(52) U.S. Cl. ...................... 358/474; 358/475; 358/482; 358/483; 358/445; 358/468
(58) Field of Search ................................ 358/482, 483, 358/475, 468, 474, 509, 512–514, 437, 442, 487, 506, 401, 501, 445, 472, 473, 497, 496, 471; 250/208.1, 234–236; 382/312, 318, 319, 313, 167; 355/67–69; 399/37, 88

(56) References Cited

U.S. PATENT DOCUMENTS 5,483,357 A * 1/1996 Nagano ...................... 358/483
5,748,340 A * 5/1998 Shimizu ...................... 358/482
5,999,279 A * 12/1999 Kouzaki et al. ............. 358/520
6,023,539 A * 2/2000 Ohnami et al. ............. 382/317
6,549,305 B1 * 4/2003 Chen .......................... 358/475
6,765,696 B1 * 7/2004 Motominami et al. ....... 358/471

FOREIGN PATENT DOCUMENTS

| JP | A 63-196158 | 8/1988 |
| JP | A 64-62072 | 3/1989 |
| JP | A 64-62074 | 3/1989 |
| JP | A 3-52376 | 3/1991 |
| JP | A 3-203453 | 9/1991 |
| JP | A 6-309449 | 11/1994 |

* cited by examiner

Primary Examiner—Cheukfan Lee
(74) Attorney, Agent, or Firm—Oliff & Berridge, PLC

(57) ABSTRACT

When an image reader is in a stand-by state in which the image reader can read an original, supply of a clock signal from a clock generation circuit to a line sensor is halted. Hence, supply of a clock signal does not need power. As a result of supply of the clock signal to the line sensor being halted, there can be reduced generation of a dark current due to the head developing in the line sensor and generation of Electromagnetic Interference. Consequently, the noise in read image data is reduced, thereby improving the picture quality of a read image. In the stand-by state, supply of only a clock signal to the line sensor is halted. Hence, the time required for warming up the line sensor is nominal. Upon receipt of a reading instruction, the image reader can immediately start reading an original, thus improving operability of the image reader.

5 Claims, 2 Drawing Sheets

IMAGE READER

BACKGROUND OF THE INVENTION

The present invention relates to an image reader.

An image reader which radiates light onto an original placed on a document table and reads, as image data, the light reflected from or passed through the original by means of image pickup device, such as a CCD, has been generally known.

In the case of such an image reader, electric charges corresponding to the quantity of the light reflected from the original are stored in the image pickup device. The thus-stored electric charges are output from the image pickup device as an electric signal corresponding to the quantity of electric charge at predetermined timing. Since the electric signal output from the image pickup device is an analog electric signal, the signal is converted into a digital electric signal by an analog-to-digital converter. The thus-converted electric signal is subjected to various modifications performed by an image data preparation circuit (corresponding to an image data preparation unit in claims), and the resultant signal is output as image data to, e.g., an external personal computer.

The above-described image reader utilizes a clock signal for setting an output timing at which an electric signal is output from image pickup device and a data processing timing at which image data are prepared from the thus-output electric signal. In synchronism with the clock timing of the clock signal, the image pickup device outputs, as an electric signal, the electric charges stored in each pixel of the image pickup device. In accordance with the clock timing of the clock signal, the image data preparation circuit performs processing, such as computation of image data.

With a view toward energy saving, demand exists not only for an image reader involving smaller power consumption but also for a computer peripheral device involving smaller power consumption. In the case of an image reader, after lapse of a predetermined period of time after an image reading operation has been completed, a lamp acting as the light source is extinguished or supply of power to a peripheral circuit, such as an image data preparation circuit, is stopped, thus curtailing power consumption except of that required for performing an image reading operation.

However, demand for energy saving has recently become increased more than ever, and power consumption must be curtailed further.

In order to save energy, there is a conceivable measure for halting supply of power to image pickup device. However, if supply of power to the image pickup device is halted, the image pickup device must be warmed up before reading an original. For this reason, a predetermined period of time is required from the time a read start instruction is issued until a reading operation is started, which in turn deteriorates the ease of operation of the image reader.

A clock signal is supplied to the image pickup device at all times. To this end, power must be supplied to the clock generation circuit for producing a clock signal. When a clock signal is supplied to image pickup device, the image pickup device is activated by the thus-supplied clock signal, to thereby generate heat. A charge coupled device, such as a CCD, employed in the image pickup device generates minute heat and also produces a so-called dark current in accordance with the quantity of heat. When an original is read, the thus-produced dark current is included in image data as noise, which may worsen the quality of the thus-read image.

As a result of supply of a clock signal, the image pickup apparatus generates Electromagnetic Interference (EMI), and the EMI worsens the quality of the thus-read image.

SUMMARY OF THE INVENTION

The object of the invention is to provide an image reader which diminishes power consumption without involvement of deterioration of operability and improves the quality of a read image.

In order to solve the aforesaid object, the invention is characterized by having the following arrangement.

An image reader comprising:
  a light source for radiating light onto an original;
  a image pickup device into which light reflected from the original or passed through the original enters and which outputs an electric signal corresponding to an amount of the entered light;
  an image data preparation unit in which the electric signal output from the image pickup device enters and which outputs the electric signal as digital image data;
  a clock generator for supplying, to the image pickup device, a clock signal for defining a timing at which the electric signal is to be output from the image pickup device;
  a controller capable of putting the image reader in a reading state for performing an original reading operation and a stand-by state in which the image reader is in a stand-by condition while remaining able to read an original, and
  a clock signal controller for halting supply of the clock signal from the clock generator to the image pickup device when the image reader is in the stand-by state.

(2) The image reader according to (1), wherein power is supplied to the light source and the image pickup device when the image reader is in the stand-by state.

(3) The image reader according to (1), wherein the clock signal controller is disposed on a board on which the image pickup device is disposed.

(4). The image reader according to (1), wherein the clock signal generator can supply a clock signal to the image data preparation unit.

(5) An image reader comprising:
  a light source for radiating light onto an original;
  a image pickup device into which light reflected from the original or passed through the original enters and which outputs an electric signal corresponding to an amount of the entered light;
  an image data preparation unit in which the electric signal output from the image pickup device enters and which outputs the electric signal as digital image data;
  a clock generator for supplying, to the image pickup device, a clock signal for defining a timing at which the electric signal is to be output from the image pickup device;
  a controller capable of putting the image reader in a reading state for performing an original reading operation, a stand-by state in which the image reader is in a stand-by condition while remaining able to read an original, and a power saving state in which supply of power to the light source and the image pickup device is halted; and
  a clock signal controller for halting supply of the clock signal from the clock generator to the image pickup device when the image reader is in the stand-by state or the power saving state.

(6) The image reader according to (5), wherein the controller shifts the image reader to the power saving state after having continuously remained in the stand-by state for a predetermined period of time.

(7) The image reader according to (5), wherein power is supplied to the light source and the image pickup device when the image reader is in the stand-by state.

(8) The image reader according to (5), wherein the clock signal controller is disposed on a board on which the image pickup device is disposed.

(9) The image reader according to (5), wherein the clock signal generator can supply a clock signal to the image data preparation unit.

According to the invention, the image reader is brought, through control, into either a reading state in which the image reader reads an original or a stand-by state in which the image reader is in a stand-by condition while remaining able to read an original. In the stand-by state, supply of a clock signal from the clock generator to the image pickup device is halted. More specifically, when the image reader is in a stand-by state, no clock signal is supplied to the image pickup device. Hence, the power required for generating a clock signal is reduced. Since supply of the clock signal is halted, the heat developing in the image pickup device is reduced, and a dark current output from the image pickup device can be diminished. Further, generation of EMI can be reduced as a result of supply of the clock signal being halted. Therefore, power consumption is reduced, and a drop in picture quality can be suppressed.

In addition to the reading state and the stand-by state, the image reader of the invention is brought into a power saving state through control. When the image reader is in the stand-by state, supply of the clock signal from the clock generator to the image pickup device is halted. Specifically, when the image reader is in the stand-by state, no clock signal is supplied to the image pickup device. For this reason, the power required for generating a clock signal is reduced. Further, since supply of the clock signal is halted, the heat developing in the image pickup device is reduced, and a dark current output from the image pickup device can be diminished. Further, generation of EMI can be reduced as a result of supply of the clock signal being halted. Therefore, power consumption is reduced, and a drop in picture quality can be suppressed.

When the image reader is in the power saving state, supply of power to a light source and the image pickup device is halted. Hence, the power to be consumed by the light source and the image pickup device can be diminished.

According to the invention, when the image reader has continuously remained in the stand-by state for a predetermined period of time, the controller brings the image reader into a power saving state. In other words, if a predetermined period of time has elapsed without reading an original, the image reader shifts from the stand-by state to the power saving state. Supply of power to the light source and the image pickup device is halted. When the image reader has continuously remained in a stand-by state for a predetermined period of time, the controller automatically brings the image reader into the power saving state. Thus, the operability of the image reader can be improved.

According to the invention, when the image reader is in a stand-by state, supply of a clock signal to the image pickup device is halted, while supply of power to the light source and the image pickup device is performed. Hence, the time required for warming up the light source and the image pickup device can be shortened. Consequently, operability of the image reader can be improved.

According to the invention, the clock signal controller is disposed on a board on which the image pickup device is disposed. Hence, space or another circuit required for positioning the clock controller becomes obviated. Consequently, the clock controller can be positioned at low cost and in a smaller space.

DETAILED DESCRIPTION OF PREFERRED EMBODIMENTS

An embodiment of the invention will be described hereinbelow with reference to the accompanying drawings.

Figure 2:
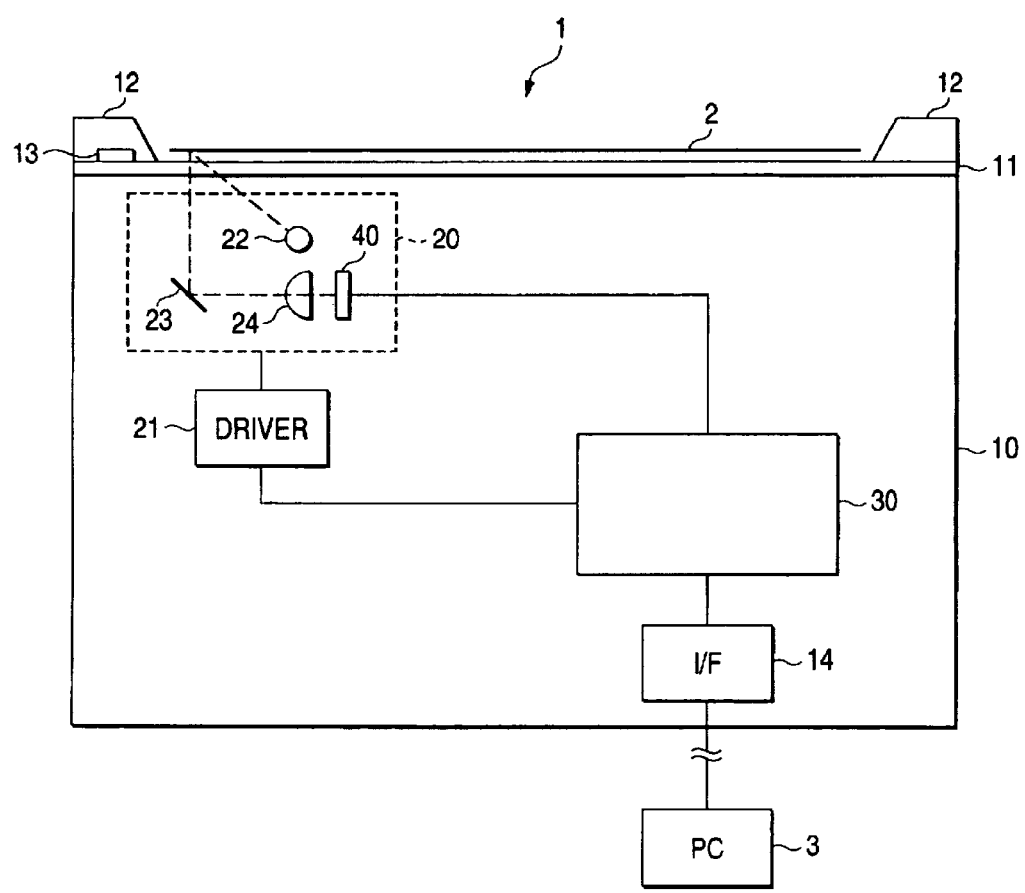
FIG. 2 is a block diagram showing an image reader according to an embodiment of the invention.

FIG. 2 shows an image reader according to an embodiment of the invention.

As shown in FIG. 2, an image reader 1 includes a box-shaped main body 10. A document table 11 on which an original 2 is to be placed is provided on top of the main body 10. Provided in the main body 10 is a carriage 20 which can move back and forth in a secondary scanning direction parallel to the document table 11 by a driver 21.

A light source 22, a mirror 23, a condenser lens 24, and a line sensor 40 acting as image pickup device are mounted on the carriage 20. The mirror 23 reflects the light to be converged on the line sensor 40 upon reflection from the original 2, thereby lengthening an optical path. The condenser lens 24 causes the light reflected from the original 2 to enter the line sensor 40. As the line sensor 40, there is employed a charge-stored-type optical sensor in which a plurality of pixels, such as CCDs, are arranged linearly in the direction perpendicular to the moving direction of the carriage 20.

The light source 22 is disposed in the primary scanning direction perpendicular to the moving direction of the carriage 20, and a fluorescent lamp is used as the light source 22. The light radiated from the light source is reflected from the surface of the original 2, e.g., paper, and the thus-reflected light enters the line sensor 40.

An original guide 12 is provided around the document table 11 for determining a position where the original 2 to be read is to be placed and for regulating movement of the original 2 during an original reading operation. A white reference 13 having a uniform reflection surface of high reflectivity is provided at the end of the document table 11 when viewed in the moving direction of the carriage.

Figure 1:
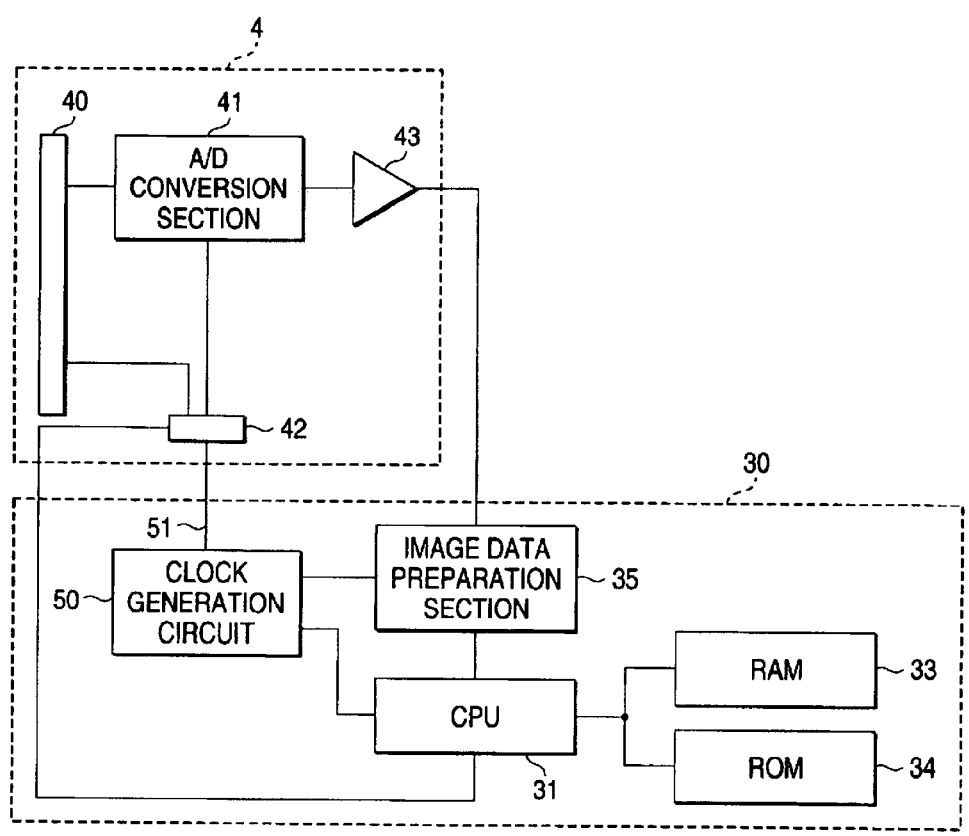
FIG. 1 is a block diagram showing the principal section of an image reader according to an embodiment of the invention.

A processing section 30 is provided in the main body 10. As shown in FIG. 1, the processing section 30 is constituted by a CPU (central processing unit) 31, RAM (random access memory) 33, ROM (read only memory) 34, an image data preparation section 35, and a clock generation circuit 50 (corresponding to a clock generator in claims). The CPU 31 controls the entire operation of the image reader 1, such as actuation of the carriage 20, switching action of the light source 22, and processing of image data prepared by the image data preparation section 35. The RAM 33 temporarily stores image data read by the line sensor 40. Stored in the ROM 34 is a computer program to be used by the CPU 31 for controlling the individual sections of the image reader 1.

The image data preparation section 35 is constituted by an unillustrated shading correction section, a gamma correction section, and other correction sections. By utilizing data produced by reading the white reference 13 before a digital signal output from an analog-to-digital conversion section 41 is read, the shading correction section corrects variations in the sensitivity of each element of the line sensor 40 or variations in the quantity of light originating from the light source 22 in the primary scanning direction. A gamma correction section performs gamma correction operation by a predetermined gamma function, thereby converting, into digital image data, a digital quantity-of-light signal which has been subjected to shading correction. The other correction sections perform various conversion operations, such as color correction, edge enhancement, and scaling of an area.

The digital image data prepared by the image data preparation section 35 are output to an external image processing apparatus, e.g., a personal computer 3, by way of an interface provided in the main body 10.

The line sensor 40 and the clock generation circuit 50 will now be described.

As shown in FIG. 1, the line sensor 40 is provided on a sensor board 4. In addition to the line sensor 40, the sensor board 4 includes the analog-to-digital conversion section 41, a clock signal control section 42 serving as clock signal controller, and a buffer 43. The analog-to-digital conversion section 41 converts an analog electric signal output from the line sensor 40 into a digital electric signal. The clock signal control section 42 opens and closes a transmission channel 51 for a clock signal supplied from the clock signal generation circuit 50, and controls supply of the clock signal to the line sensor 40 and the analog-to-digital conversion section 41. When the clock signal control section 42 halts supply of the clock signal, the line sensor 40 stops outputting an electric signal. The buffer 43 improves the capability of driving the digital signal output from the analog-to-digital conversion section 41.

The clock generation circuit 50 outputs the electric signal supplied from the line sensor 40 and the clock signal supplied from the analog-to-digital conversion section 41. More specifically, the line sensor 40 outputs an analog electric signal corresponding to the amount of electric charge accumulated in each pixel, in synchronism with the clock signal output from the clock generation circuit 50.

The operation of the image reader 1 will now be described.

The CPU 31 controls the image reader 1 according to the embodiment so as to enter any one of a standby state, a reading state, and a power saving state.

Here, the standby state is a state in which the image reader is in a stand-by condition while remaining able to read the original 2. The reading state is a state in which the carriage 20 is moved and reads the original 2. After lapse of a predetermined period of time while the image reader continuously remains in a stand-by condition, the image reader 1 enters a power saving state. In the power saving state, supply of power to the light source 22, the line sensor 40 or the analog-to-digital converter 41 is halted for reducing power consumption.

When the image reader is in the stand-by state, the light source 22 is illuminated, and the image reader can read the original 2 whenever the user gives an instruction. Further, power is supplied from an unillustrated power supply section to individual sections of the processing section 30, such as the CPU 31, the analog-to-digital conversion section 41, the image data preparation section 35, and the clock generation circuit 50.

In the stand-by state, the clock signal control section 42 closes the transmission channel 51 in accordance with an instruction output from the CPU 31, so that the clock signal output from the clock generation circuit 50 is not supplied to the sensor board 4. In other words, supply of a clock signal to the line sensor 40 and to the analog-to-digital conversion section 41 is halted.

Power of the line sensor 40 is held in an ON position. However, the line sensor 40 output no electric signal, because no clock signal is supplied to the line sensor 40.

At the time of reading of the original 2, the user places the original 2 on the document table and gives an instruction for starting reading the original 2 to the image reader 1 through the personal computer 3. Upon receipt of the image reading start instruction, the image reader 1 shifts from the stand-by state to a reading state. When the image reader has shifted to the image reading state, the clock signal control section 42 opens the transmission channel 51 in pursuant to the instruction output from the CPU 31, so that the clock signal output from the clock generation circuit 50 is supplied to the sensor board 4. The power of the line sensor 40 is in an ON position in the stand-by state, and therefore, the line sensor 40 outputs an electric signal when supply of the clock signal is started.

When the image reader shifts from the stand-by state to the reading state, a period of time for warming up of the line sensor 40 is short, because the power of the line sensor 40 remains in an ON position in the stand-by state, and only output of an electric signal in synchronism with the clock signal is halted.

When the image reader has shifted to the reading state, the CPU 31 actuates the carriage 20 to move in the secondary scanning direction at constant speed by controlling the driver 21. The light reflected from the original 2 enters the line sensor 40, and the thus-entered light is accumulated after having been converted into electric charges. The thus-accumulated electric charges are sequentially output to the image data preparation section 35 for each electric signal corresponding to one line. The digital image data that have been corrected by the image data preparation section 35 are output to the personal computer 3 via the interface 14.

Reading of the original 2 is performed such that the foregoing processing operations is repeated while the carriage 20 is moved in the secondary scanning direction at a constant speed.

After completion of reading of the original 2, the image reader 1 shifts from the reading state to the stand-by state. Hence, the clock signal control section 42 closes the transmission channel 51 in accordance with the instruction output from the CPU 31, thereby halting supply of a clock signal to the sensor board 4. Consequently, the line sensor 40 stops outputting an electric signal.

After lapse of a predetermined period of time while the image reader has continuously remained in the stand-by state, the image reader 1 enters the power saving state for reducing power consumption. In the power saving state, the CPU 31 extinguishes the light source 22 and halts supply of power to the line sensor 40 and the analog-to-digital converter 41.

When the image reader in the power saving state has received an image read start instruction from the personal computer 3, the image reader shifts to the stand-by state through the warm-up state. In the warm-up state, the CPU 31 activates the light source 22, supplies power to the line sensor 40 and the analog-to-digital converter 31, and continues performing warm-up operation until the quantity of light originating from the light source 22 reaches a predetermined level. When the quantity of light generated by the light source 22 has reached a predetermined level, the image reader shifts from the warm-up state to the stand-by state. When the image read start instruction is issued, the image reader shifts to the reading state simultaneously with having entered the stand-by state, thus initiating a reading operation.

As has been described, in the stand-by state, the image reader according to an embodiment of the invention halts supply of a clock signal to the line sensor 40. For this reason, the power required for supplying a clock signal and the power required by the line sensor 40 to output an electric signal become obviated. Consequently, the power consumed by the image reader 1 can be reduced.

As a result of supply of a clock signal to the line sensor 40 being halted, the heat developing in the line sensor 40 can be diminished, so that the dark current developing in the line sensor 40 can be reduced. Read image data do not contain any dark current, and hence the quality of a read image can be improved.

As a result of supply of a clock signal to the line sensor 40 being halted, generation of EMI can be reduced, which, in turn, reduces deterioration of picture quality due to the noise contained in read image data.

When the image reader is in the stand-by state, only supply of a clock signal to the line sensor 40 is halted, and the time required for warming up the line sensor 40 is nominal. Upon receipt of a reading instruction, the image reader can immediately start reading the original 2. Consequently, the operability of the image reader 1 can be improved.

In accordance with the image reader 1 according to an embodiment, the clock signal control section 42 is provided on the same sensor board 4 as that on which the line sensor 40 is mounted. Hence, there is obviated a necessity for mounting the clock signal control section 42 separately from the line sensor 40. Since the space dedicated to the clock signal control section 42 is obviated, the cost and space of the image reader can be reduced.

The previously-described embodiment of the invention has described a case where a reflective original, such as paper, is read by use of an image reader of flat bed type. However, the present invention is not limited to the image reader of flat bed type and can be applied to an image reader of sheet feeder type. Moreover, the invention is not limited to a reflective original but can be applied to an image reader which reads translucent original, such as a film.

What is claimed is:

1. An image reader comprising:
a light source for radiating light onto an original;
an image pickup device into which light reflected from the original or passed through the original enters and which outputs an electric signal corresponding to an amount of the entered light;
an image data preparation unit in which the electric signal output from the image pickup device enters and which outputs the electric signal as digital image data;
a clock generator for supplying, to the image pickup device, a clock signal for defining a timing at which the electric signal is to be output from the image pickup device;
a controller capable of putting the image reader in a reading state for performing an original reading operation, a stand-by state in which the image reader is in a stand-by condition while remaining able to read an original, a power saving state in which supply of power to the light source and the image pickup device is halted, and a warm-up state in which the supply of power to the light source and image pickup device is started, wherein when the image reader is in the power saving state, the controller shifts the image reader from the power saving state to the reading state through the warm-up state and the stand-by state upon receipt of an image read signal; and
a clock signal controller for halting supply of the clock signal from the clock generator to the image pickup device when the image reader is in the stand-by state or the power saving state.

2. The image reader according to claim 1, wherein the controller shifts the image reader to the power saving state after having continuously remained in the stand-by state for a predetermined period of time.

3. The image reader according to claim 1, wherein power is supplied to the light source and the image pickup device when the image reader is in the stand-by state.

4. The image reader according to claim 1, wherein the clock signal controller is disposed on a board on which the image pickup device is disposed.

5. The image reader according to claim 1, wherein the clock signal generator can supply a clock signal to the image data preparation unit.

* * * * *